United States Patent

[11] 3,623,743

[72] Inventor John D. Rohrer
North Manchester, Ind.
[21] Appl. No. 855,866
[22] Filed Sept. 8, 1969
[45] Patented Nov. 30, 1971
[73] Assignee Parker Industries Inc.
Silver Lake, Ind.

[54] TOWED VEHICLE TONGUE ASSIST STRUCTURE
10 Claims, 6 Drawing Figs.

[52] U.S. Cl. .......................................... 280/103,
280/444, 280/489
[51] Int. Cl. ....................................... B60d 1/00
[50] Field of Search ............................. 280/489,
483, 103, 444

[56] References Cited
UNITED STATES PATENTS
2,452,710 11/1948 Allen .......................... 280/489

FOREIGN PATENTS
1,407,799 6/1965 France .......................... 280/489
810,503 12/1936 France .......................... 280/489
548,095 4/1932 Germany ....................... 280/489
835,262 3/1952 Germany ....................... 280/489
358,695 1/1962 Switzerland .................... 280/489

Primary Examiner—Leo Friaglia
Attorneys—Hobbs and Green and Kemon, Palmer and Estabrook ABSTRACT: A tongue assist structure for a towed vehicle in which a tongue mounting fixture is pivotally secured to the front axle assembly of the vehicle and a tongue is pivoted horizontally to the fixture, and in which a leaf spring means is secured to the underside of the fixture and extends longitudinally along the underside of the tongue for urging the tongue in a substantially horizontal position.

INVENTOR.
JOHN D. ROHRER
BY
Hobbs & Green
ATTORNEYS

*INVENTOR.*
JOHN D. ROHRER
BY
*Hobbs & Green*
ATTORNEYS

TOWED VEHICLE TONGUE ASSIST STRUCTURE

The conventional wagon running gear for gravity beds, flat racks, forage boxes, and the like used in connection with farm operations, as well as industrial applications, has a tongue for coupling the wagon to a tractor, truck or other towing vehicle. Since the wagons are often rather large and heavy, particularly when loaded, the tongue or draw bar must necessarily be large and heavy to provide the required strength for towing the wagon. The conventional or standard tongue generally is pivoted on or near the front axle of the wagon, and in view of the weight and length of these tongues, they are difficult to lift when the wagon is coupled to and uncoupled from the towing vehicle. While various types of supports for the tongue have been tried, they generally have been unsatisfactory in that they fail to minimize the tongue weight under all conditions, and they often interfere with the operation and manipulation of the tongue during the coupling and uncoupling operations. It is therefore one of the principal objects of the present invention to provide a structure for assisting in the handling and manipulation of a wagon tongue of the aforementioned type, which permits the tongue to be maneuvered to various positions for easy coupling and uncoupling, and which provides assistance for lifting the tongue regardless of the normal angular position of the tongue relative to the wagon or towing vehicle.

Another object of the invention is to provide a tongue structure for a wagon running gear which has sufficient strength to safely and effectively pull the wagon without danger of breaking, and which is sufficiently easy to handle that one man can readily lift and move the tongue into any normal operating position.

Still another object of the invention is to provide a tongue assist mechanism which can readily be installed on any towed vehicle with a hinge-type tongue of either round or rectangular cross-sectional construction, and which can vary the applied force to provide the desired assistance to any particular tongue installation.

A further object is to provide a tongue assist structure which is simple and compact and which can be installed in the field on used running gear without making any substantial changes in the construction of the vehicle tongue or connecting mechanisms.

Additional objects and advantages of the invention will become apparent from the following description and accompanying drawings, wherein.

Figure 1:
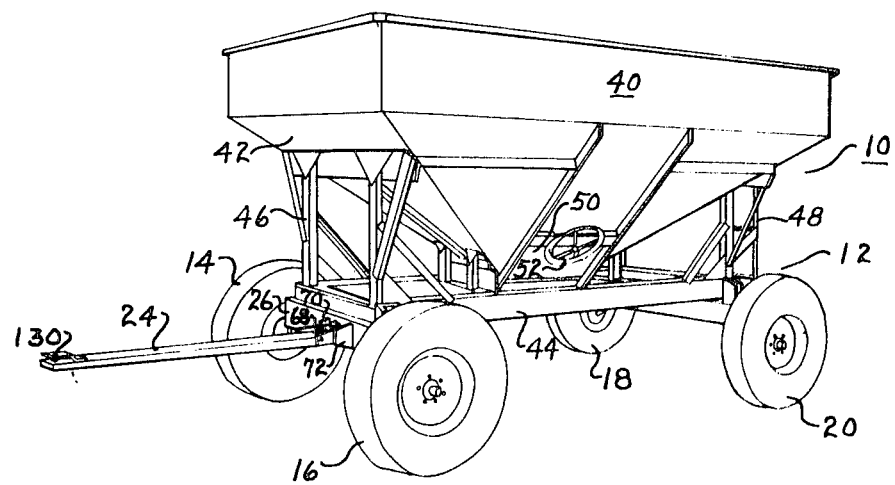
FIG. 1 is a perspective view of a farm wagon having a gravity bed thereon.
Figure 2:
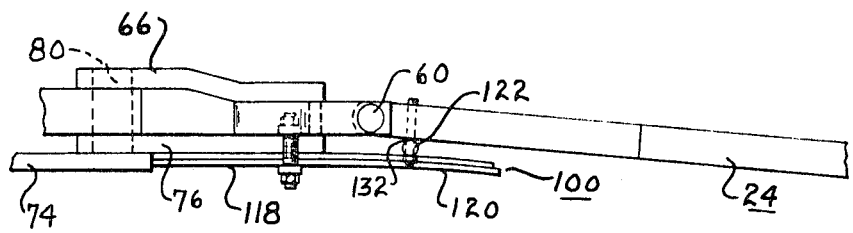
FIG. 2 is a side elevational view of the tongue structure of the wagon shown in FIG. 1.
Figure 3:
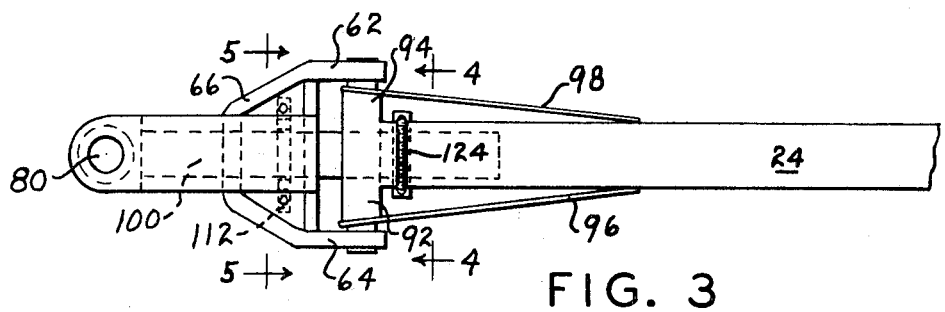
FIG. 3 is a top plan view of the tongue structure shown in FIG. 2.
Figure 4:
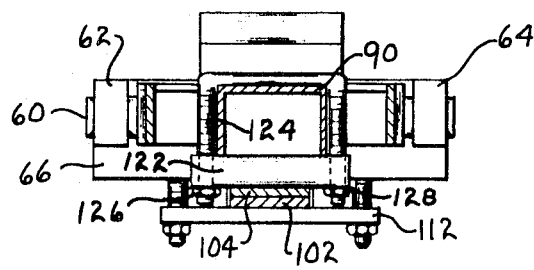
FIG. 4 is a vertical cross-sectional view of the tongue shown in the preceding figures, the section being taken on line 4—4 of FIG. 3.
Figure 5:
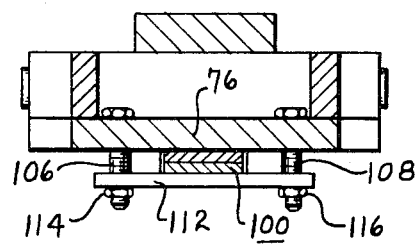
FIG. 5 is a vertical cross-sectional view of the tongue shown in the preceding figures, the section being taken on line 5—5 of FIG. 3.
Figure 6:
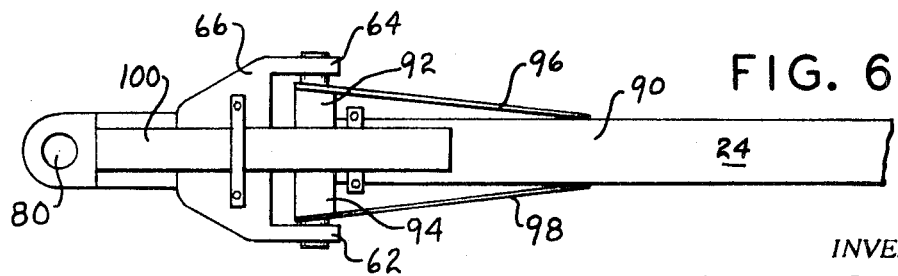
FIG. 6 is a bottom view of the tongue shown in the preceding figures.

Referring more specifically to the drawings, and to FIG. 1 in particular, numeral 10 designates generally a farm vehicle consisting generally of an undercarriage or running gear 12 with two front wheels 14 and 16 and two rear wheels 18 and 20. The four wheels are illustrated as having rubber tires, and the front wheels are steered by a tongue 24 through a mechanism located primarily behind the front axle assembly 26 and secured to the axle mounting fixture. The wheels, rear axle, and frame of the running gear are considered, for the purpose of the present invention, as conventional in construction and operation, and hence will not be described in detail herein. The gravity bed 40 is mounted on the running gear 12 and generally consists of a container 42 mounted on a frame structure 44 and supported on the frame structure by support members generally indicated by numerals 46 and 48. The type of gravity bed shown in the drawings is a center discharge type having a door 50 on each side operated by a hand wheel 52 to open and close the doors. The gravity bed can be easily lifted from the undercarriage or running gear and replaced by other types of beds, or used without a bed.

The tongue 24 is normally a length of tubing or channel iron of rectangular cross-sectional shape, and since it is made of steel, it is relatively heavy in order to provide the required strength. The tongue is pivoted on a horizontal pivot pin 60 extending through arms 62 and 64 of bracket 66. The bracket is pivotally secured to the axle assembly by a vertical pivot pin 68 supported on the axle assembly by members 70 and 72, the latter members preferably being welded or otherwise rigidly secured to the assembly. The two front wheels are operated through a lever 74 rigidly connected to a forwardly extending member 76, which in turn is joined integrally to bracket 66. Lateral slewing of the tongue on pivot pin 68 in opening 80 causes lever 74 to operate the linkage to the wheels, and thereby pivots the wheels together to steer the vehicle. The tongue 24 shown in the drawings consists of channel iron member 90 and two bearing members 92 and 94 supported laterally by braces 96 and 98 connected to the respective bearings and to member 90 along the sides thereof. The forward end of the tongue contains a fixture 130 for coupling the tongue and wagon to a tractor or other towing vehicle.

In order to assist in lifting and supporting tongue 24, an assist is used consisting of a leaf spring structure 100 shown in the drawings as consisting of two leaf springs 102 and 104. This leaf spring structure is firmly supported on the underside of the bracket 66 by bolts 106 and 108 extending downwardly through member 76 of the bracket and supporting a bar 112, the bar being held in place by nuts 114 and 116 on the lower ends of bolts 106 and 108, respectively. The bolts and bar 112 retain the rearward portion 118 firmly against the underside of member 76. The forward end of the leaf spring means 120 projects forwardly from bar 112 to a point beneath member 90 of tongue 24 engages an antifriction or wear block 122 held in place near the rear end of the tongue by an inverted U-shaped bracket 124 having threaded ends extending through holes in the block and having nuts 126 and 128 threaded thereon for retaining the block firmly in place on the tongue. The weight of the tongue is applied to the leaf spring structure through block 122, and since the block as shown in the drawings is round, it forms an effective transverse bearing surface for the upper side of the leaf spring structure.

In the operation of the present tongue assist structure installed in the manner illustrated in the drawings, the forward end 120 of the leaf spring structure applies sufficient upward pressure against the block 122 to pivot the forward end of the tongue upwardly to substantially horizontal position, as illustrated in FIG. 1. The tongue, however, may be lifted above or depressed below horizontal, both while the coupling operation is being performed, and when the tractor is pulling the wagon. The present tongue assist may be adjusted to apply the desired pressure to the underside of the tongue by lowering or raising block 122. The block may be lowered by placing shims between the block and the underside of the tongue, and may be raised by removing the shims. The drawings illustrate only one shim 132; however, a number of shims may be used to satisfy requirements.

One of the advantages of the present tongue assist structure is its compactness, and the fact that it lies relatively close to the underside of the tongue and tongue support bracket. Further, the assist structure can be easily mounted in the field on wagons in use by mounting the two bolts 106 and 108 on the bracket and attaching bracket 90 and block 122 to the tongue. Since the tongue pivots on pivot pin 68, the tongue assist structure pivots with the tongue and in no way interferes with the normal and effective operation of the tongue in pulling and steering the wagon. In order to further adapt the assist structure to different tongues and to different installations, additional leaf springs may be included, or fewer may be used.

While only one embodiment of the present tongue assist structure has been described in detail herein, various changes and modifications may be made without departing from the scope of the invention.

I claim:

1. A tongue structure for a towed vehicle having a front axle assembly, comprising a fixture means secured to said axle assembly, a tongue means, a pivot member connecting said tongue means to said fixture means on a transverse horizontal axis, a leaf spring structure firmly connected to one of said means and transferring a force to the other of said means for yieldably urging said tongue means toward a substantially horizontal position, means pivotally connecting said fixture means to said axle assembly and a member connected to said fixture means for transmitting a steering force to the front wheels of said towed vehicle as said tongue is moved angularly laterally.

2. A tongue structure for a towed vehicle as defined in claim 1 in which said leaf spring structure is firmly attached to said fixture means.

3. A tongue structure for a towed vehicle as defined in claim 2 in which a wear block is disposed between said leaf spring structure and said tongue means.

4. A tongue structure for a towed structure as defined in claim 3 in which said leaf spring structure is disposed on the underside of said fixture means and said tongue means.

5. A tongue structure for a towed vehicle as defined in claim 4 in which a member projects rearwardly from said fixture means for transmitting a steering force to the front wheels of said towed vehicle as said tongue is moved angularly laterally.

6. A tongue structure for a towed vehicle as defined in claim 1 in which a wear block is disposed between said leaf spring structure and the other of said means.

7. A tongue structure for a towed structure as defined in claim 1 in which said leaf structure consists of a plurality of leaf springs and a horizontal barlike member secures one end of said leaf spring structure firmly to said fixture means.

8. A tongue structure for a towed vehicle as defined in claim 1 in which said leaf spring structure is disposed on the underside of said fixture means and said tongue means.

9. A tongue structure for a towed vehicle as defined in claim 1 in which said spring structure consists of a plurality of leaf springs secured to said fixture means and extending longitudinally with said tongue means on the underside thereof and extending across said pivot member.

10. A tongue structure for a towed vehicle as defined in claim 1 in which a member projects rearwardly from said fixture means for transmitting a steering force to the front wheels of said towed vehicle as said tongue is moved angularly laterally.

* * * * *